United States Patent Office 3,702,722
Patented Nov. 14, 1972

3,702,722
ELECTRO-OPTIC QUADRUPOLE DEFLECTOR
Ralph Francis Trambarulo, Red Bank, N.J., assignor to Bell Telephone Laboratories, Incorporated, Murray Hill and Berkeley Heights, N.J.
Filed Oct. 26, 1971, Ser. No. 192,540
Int. Cl. G02f 1/26
U.S. Cl. 350—150    6 Claims

ABSTRACT OF THE DISCLOSURE

The quadrupole electrodes in an electro-optic quadrupole light beam deflector are shaped to correspond to surfaces of constant potential in the electro-optic crystals and the lateral portions of the crystals between the electrodes are cut to correspond to lines of electric flux. In determining the surfaces and lines, account is taken of the anisotropic nature of typical electro-optic crystals such as potassium dihydrogen phosphate (KDP). The improvement provides significant reductions from prior art deflectors both in light beam distortion and power dissipation.

BACKGROUND OF THE INVENTION

This invention relates to improvements in electro-optic quadrupole light beam deflectors. More particularly, this invention relates to improved electrode and crystal shapes in electro-optic quadrupole light beam deflectors to provide reduced optical distortion.

The bending of plane polarized light rays by index-gradient refraction in electro-optic materials requires an electric field that varies linearly in a direction transverse to the beam path. Such a field was first achieved in a system such as disclosed in the article by V. J. Fowler et al., Proceedings of the IEEE, vol. 52, page 193 (February 1964), in which a deflection stage includes four quadrupole electrodes opposed in pairs through the axis of an electro-optic crystal, with the opposing members of each pair driven to the same potential. With the electrodes having hyperbolically shaped inner surfaces contacting the crystal, the field between the orthogonally displaced pairs of electrodes can be made to exhibit the necessary linear variation in a transverse direction, at least in the vicinity of the crystal near its axis. Linear deflection of the light beam is produced because of a change in refractive index provided by the proper alignment of electric field and crystalline axes. The addition of a 90 degree polarization rotator and of a second stage rotated 90 degrees about a common axis to the first stage yields the electro-optic deflection in two coordinates.

In U.S. Pat. No. 3,575,487, issued to E. A. Ohm and myself, and assigned to the assignee hereof, and improved two-coordinate electro-optic quadrupole deflector was disclosed which required a reduced number of parts to produce the desired two-stage deflection with the quadrupole electrodes symmetrically shaped with respect to the axis of the device and with the lateral disposition of the electrodes in the second stage rotated by 45 degrees about the common axis with respect to the disposition of the electrodes of the first stage, the 90 degree polarization rotator, originally thought to be essential for two-coordinate deflection, was eliminated. Furthermore, since the crystalline axis orientations of the electro-optic material were identical in both stages of the device, it became possible to implement these stages in successive portions of the single electro-optic crystal.

There are a few fundamental problems with the above-described deflection arrangements that have somewhat restricted their scope of application. Failure to take account of the anisotropic nature of the deflecting crystals in the design of the devices gives them an appreciable degree of inherent optical distortion. External lens arrangements for correcting such distortion are often complex, expensive and, for the most part, ineffective.

Because of the high degree of power dissipation in the devices, excessive amounts of heat build up in the crystals during operation at high deflection frequencies. Aberrations of the optical beam result from uncontrolled variations of the refractive index of the crystals due to localized temperature changes therein. It becomes necessary to operate the deflectors at low drive power and at low deflection frequences in order to minimize the heating effects. This, in turn, puts limits on resolution and imposes other performance limitations on the devices in practical applications.

Furthermore, the above-described deflection arrangements have relatively high capacitances. A high capacitive load in the devices requires high driving currents to charge the load. The high level of drive power required, as well as the large power losses that can result in the driving circuits, are generally undesirable.

SUMMARY OF THE INVENTION

I have recognized that the electro-optic crystal and electrode shapes in the electro-optic quadrupole deflection system of the above-cited patent can be designed to provide reduced optical distortion. The electro-optic deflection stages embodied according to my present invention also have reduced capacitance and power dissipation and consequently alleviate the problems of heating which limit the attainable resolution of the device.

According to a specific feature of my invention, the necessary transverse linear variation of electric field in the electro-optic crystals is more accurately obtained throughout the crystal cross section by taking account of the anisotropic nature of typical crystals in determining the electrode and crystal contours.

According to another feature of my invention, the improved quadrupole electro-optic light deflection system, because of its inherently lower power dissipation, can be employed at higher deflection frequencies or circular scanning rates than can other prior art deflectors. This provides an inherent faster response capability in addition to the low optical distortion feature of the device.

These and other features of my invention are realized by reshaping the quadrupole electrodes and the crystal surfaces between them. The change in shape is calculated by employing a tensorial representation of the dielectric constant of the electro-optic material, such as potassium dihydrogen phosphate (KDP), to determine the surfaces of constant potential and the electric flux lines in the crystals. The quadrupole electrodes are then provided with inner surfaces contacting the crystals corresponding to the surfaces of constant potential. The remaining portions of the crystal are cut to have lateral surfaces corresponding to the flux lines.

Specifically, in a preferred and simplified embodiment of my invention, crystals of electro-optic material such as KDP, are formed to have eight lateral surfaces which are arcuate in cross section. Four quadrupole electrodes contact four orthogonally-oriented surfaces of the crystal and conform to the contour thereof. The contours of the four surfaces contacting the electrodes in a first deflection stage and, therefore, the contours of the electrodes themselves, have a radius of curvature of magnitude equal to the distance of closest approach of the surfaces to the axis of the stage. The remaining four surfaces in the first deflection stage have contours with radii of curvature equal to this magnitude multiplied by the respective ratios of first and second low frequency dielectric constants of the crystal, the first constant taken in a direction parallel to the optic axis of the crystal, the second constant taken in a direction in the crystal normal to the optic axis and normal to the stage axis.

Likewise, the contours of the four surfaces between the electrodes in a second deflection stage are made to have a radius of curvature of magnitude equal to the distance of closest approach of the surfaces to the stage axis. The remaining four surfaces in the second deflection stage contacting the electrodes, and the electrodes themselves, have contours with radii of curvature equal to this magnitude multiplied by the same ratios of dielectric constants of the material.

BRIEF DESCRIPTION OF THE DRAWINGS

A more complete understanding of the foregoing and other features and advantages of my invention can be obtained from the following detailed description taken with reference to the accompanying drawings, in which.

DESCRIPTION OF THE ILLUSTRATIVE EMBODIMENTS

Figure 1:
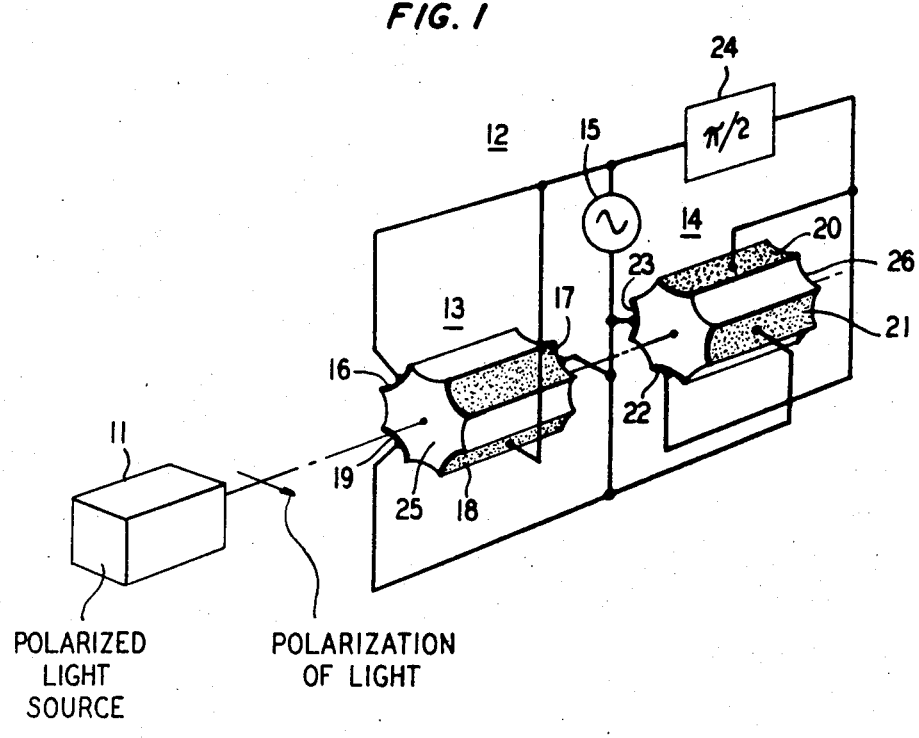
FIG. 1 is a partially pictorial and partially schematic illustration of an illustrative embodiment of my invention.

FIG. 1 illustrates typical electro-optic quadrupole light beam deflection apparatus 12 embodied according to my invention. The basic construction of the apparatus is substantially similar to that of the patent referred to hereinabove. The important distinctions exist, however, in the unique shape of electro-optic crystals 25 and 26, and in the unique curvature of quadrupole electrodes 16–19 and 20–23 in the deflection stages 13 and 14, respectively, both of which can be more readily appreciated from the illustrations of FIGS. 2 and 3. So that my invention is completely understood, it is useful first to explain the basic construction and operation of the apparatus of FIG. 1. A more detailed explanation of the configurations of FIGS. 2 and 3 will be provided thereafter.

Specifically, then, in the embodiment of FIG. 1, it is desired to deflect a horizontally polarized coherent light beam from source 11 in the two orthogonal coordinates, illustratively in a circular-scanning fashion. The two-coordinate deflection is achieved in the two-stage deflection apparatus 12 including horizontal deflection stage 13 and vertical deflection stage 14, both driven from source 15 of a sinusoidal deflecting voltage. The horizontal deflecting stage 13 includes electro-optic crystal 25 having eight lateral surfaces which are arcuate in cross section with a concave shape with respect to the axis of the stage. The four quadrupole electrodes 16, 17, 18 and 19 are equally separated about the axis of stage 13 contacting and conforming to the contour of alternate surfaces of crystal 25. The opposing electrodes 16 and 18 are connected to the same terminal of source 15 and thus are driven to the same potential; while the opposing electrodes 17 and 19 are both connected to a second terminal of source 15 and are both driven to a second potential which is typically of the opposite polarity with respect to the first potential. Thus, a zero electric field will typically exist constantly upon the axis of stage 13.

Vertical deflection stage 14 includes electro-optic crystal 26 shaped and oriented identically as in the previous stage 13. The four quadrupole electrodes 20, 21, 22, and 23, are likewise equally separated about the axis of stage 14, contacting and conforming to the contour of alternate surfaces of crystal 26; but their lateral positions are rotated by 45 degrees clockwise as viewed from source 11 about the common axis of stages 13 and 14 from the electrodes in stage 13, which are numbered four digits lower. Thus, the opposed electrodes 20 and 22 are connected through the phase shifting circuit 24 to the same terminal of source 15 as electrodes 16 and 18 in stage 13. The opposed electrodes 21 and 23 are connected together to the same terminal of source 15 as are the electrodes 17 and 19 in stage 13.

The phase shift provided by phase shifting circuit 24 is illustratively $\pi/2$ radians or 90 degrees, for the illustrative case of a circular scan.

Figure 2:
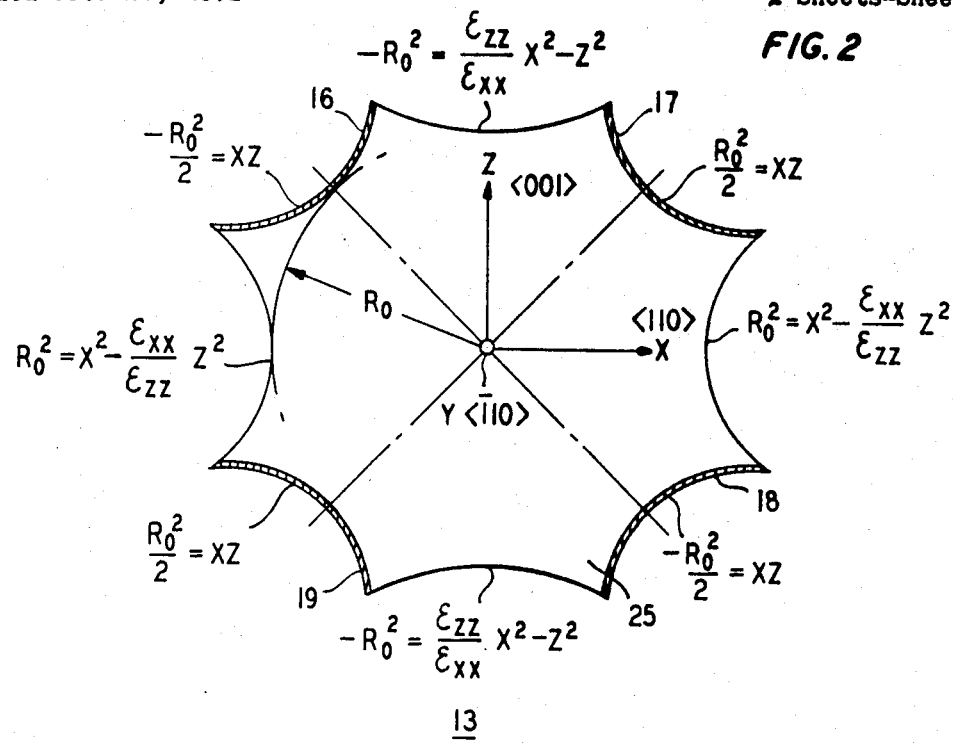
FIG. 2 is a pictorial illustration of a cross-sectional view of deflection stage 13 of FIG. 1 showing the electrode and surface contours which are employed according to my invention.

Electro-optic crystals such as KDP have an optic axis along the 001 crystalline direction that represents a preferred direction along which to apply the electric field. For a plane polarized light beam passing through the crystal along the $\overline{1}10$ crystalline direction perpendicular to the field with its polarization also perpendicular to the field in the 110 crystalline direction, the refractive index experienced by the beam will change as the field is varied in magnitude. Thus, as shown in FIG. 2, for the horizontally polarized input beam from source 11, the z axis (optic axis) in crystal 25 is vertical in the drawing with positive z upward and along the 001 crystalline direction for the illustrative case in which the electro-optic material is KDP. The x axis is horizontally oriented with the positive sense to the right along the 110 crystalline direction, illustratively, and the y axis is along the mean direction of light beam propagation, with the positive sense along the $\overline{1}10$ crystalline direction and in the same direction as the light beam propagation. The same crystalline axis and coordinate orientations are provided in crystal 26 so that crystals 25 and 26 may be implemented in successive portions of a single KDP crystal since no polarization rotator is required therebetween. For this reason, it is advantageous to use an electro-optic crystal such as KDP which can be grown from a water solution to rather great dimensions.

To summarize then, the positive senses of the x, y and z axis are the 110, $\overline{1}10$, and 001 crystalline directions in KDP according to the conventions which are here employed.

The relationship between the refractive index experienced by the beam and the applied electric field in crystals 25 and 26 can now be expressed by the equation $$n = n_0 - \frac{1}{2} n_0^3 r_{63} E_z \qquad (1)$$

where $n_0$ is the unperturbed refractive index of the crystals, $r_{63}$ is an electro-optic coefficient and $E_z$ is the component of the electric field in the z direction. It should be noted that the sign of the change in index depends upon the sign of $E_z$.

In the operation of the embodiment of FIG. 1, a voltage applied from source 15 to the electrodes of stage 13 with a positive potential on electrodes 16 and 18 and negative potential on electrodes 17 and 19 will produce a nonuniform field in crystal 25. The z component of the field will be most intense in the region of smaller spacing between electrodes 17 and 18, on the one hand, where the field direction is the negative z sense, and in the region of the smaller spacing between electrodes 16 and 19, on the other hand, where the positive direction of the field is in the positive z direction. There will be a zero z component of field upon the vertical axis of the device and a smooth variation of the z component of field between the vertical axis and the regions of maximum z field. Thus, the greatest mass of "slow" material will be at the left-hand edge of crystal 25 between electrodes 17 and 18, and the greatest mass of "fast" material will be on the right-hand edge between electrodes 16 and 19.

Accordingly, the light beam will be deflected to the left in stage 13, as viewed from FIG. 2. For the same sense of voltage from source 15 the deflection in stage 14 will be minimum in the vertical direction when the deflection in stage 13 is maximum, as would be expected from the 90 degree phase shift provided by circuit 24.

Let us examine the operation of the second stage 14 a quarter cycle after the operation just described for stage 13. The positive potential will now appear on electrodes 20 and 22 and the negative potential at electrodes 21 and 23. It is immediately seen that again the field is zero on the axis and that the z component of field is strongest along the z axis at points at the top and bottom of crystal 26. The greatest mass of "slow" material is therefore at the top of crystal 26, where the field is opposite to the positive sense of the z axis; and the greatest mass of "fast" material is at the bottom of crystal 26 near electrode 22, where the field direction parallels the positive sense of the z axis. Accordingly, the light beam, which is horizontally polarized for maximum electro-optic effect from the field along the z axis, will be deflected in the upward direction. A circular scan of the light beam from source 11 is thus provided by driving horizontal deflection stage 13 in quadrature with vertical deflection stage 14.

In general, to achieve the desired deflection in the apparatus of FIG. 1, it is required that:

$$\frac{\partial E_z}{\partial x} = A \text{ and } \frac{\partial E_z}{\partial z} = B \tag{2}$$

in the deflecting crystals, where $E_z$ is the z component of the electric field vector $\overline{E}$ relative to the indicated coordinate system of FIG. 2, and A and B are constants, with $B=0$ for the horizontal deflection stage 13, and $A=0$ for the vertical deflection stage 14.

Although electro-optic materials such as KDP are desirable for other reasons (see above), they make the achievement of the conditions of Equation 2 difficult because their dielectric constants are not isotropic and must be represented by a tensor. For example, in the x–z plane of FIG. 2, the dielectric constant for KDP could be represented as follows:

$$(\epsilon) = \begin{pmatrix} \epsilon_{xx} & 0 \\ 0 & \epsilon_{zz} \end{pmatrix} \tag{3}$$

where $(\epsilon)$ is diagonal and $\epsilon_{xx}$ and $\epsilon_{zz}$ are relative scalar components of the tensor and are equal to the low frequency dielectric constants experienced by the light beam in the crystals taken in directions normal to the optic axis and parallel to the optic axis of the crystals, respectively. The electric flux density in the crystals is then given by the following vector:

$$\overline{D} = (\epsilon)\overline{E}$$
$$\text{with}$$
$$D_x = \epsilon_{xx} E_x \qquad D_z = \epsilon_{zz} E_z \tag{4}$$

where $D_x$ and $D_z$ are the components of the electric flux density vector $\overline{D}$ in the x and z directions, respectively, and the other terms are as defined above.

In determining the lines of constant potential in crystals 25 and 26 in the plane of FIG. 2, Maxwell's equation is applied to the electric flux density vector $\overline{D}$ with the above conditions of Equation 2:

$$\nabla \overline{D} = 0$$
$$\text{or}$$
$$\epsilon_{xx} \frac{\partial E_x}{\partial x} + \epsilon_{zz} \frac{\partial E_z}{\partial z} = 0 \tag{5}$$

The electric field vector components $E_x$ and $E_z$ can be shown to be of the following form:

$$E_x = \frac{-\epsilon_{zz}}{\epsilon_{xx}} Bx + Az$$
$$E_z = Ax + Bz \tag{6}$$

Since the electric field vector components are the negative partial derivatives of the constant potential function $\psi$ within the deflecting crystals $$\left( E_x = \frac{-\partial \psi}{\partial x}, \quad E_z = \frac{-\partial \psi}{\partial z} \right)$$

an integration of Equation 5 yields $$\psi = \frac{B}{2}\left(\frac{\epsilon_{xx}}{\epsilon_{zz}} x^2 - z^2\right) - Axz \tag{7}$$

The shape of the electric flux lines in the x–z planes, which are everywhere orthogonal to the lines of constant potential $\psi$, are of the form:

$$\phi = \frac{A}{2}\left(x^2 - \frac{\epsilon_{xx}}{\epsilon_{zz}} z^2\right) + Bxz \tag{8}$$

where $\phi$ is a constant for each flux line. It should be noted that the functions of both Equations 7 and 8 are hyperbolic.

Each electrode in the deflection stages 13 and 14 should have an inner surface contacting the crystals 25 and 26 corresponding to a constant potential surface therein to produce the quadrupolar electric field in the dielectric characterized by the conditions of Equation 2. For the horizontal deflection stage 13, in which the deflection of the light beam is along the x axis, $B=0$, and the constant potential function in the x–z plane is given by $$\psi = -Axz \tag{9}$$

Thus, electrodes 16–19 in FIG. 2 should have inner surfaces contacting crystal 25 of the general form $\pm xz$.

For the vertical deflection stage 14 in which the deflection of light beam is along the z axis, $A=0$, the constant potential function is given by $$\psi = \frac{B}{2}\left(\frac{\epsilon_{xx}}{\epsilon_{zz}} x^2 - z^2\right) \tag{10}$$

Electrodes 20–23 should therefore have inner surfaces contacting crystal 26 of the form $$\pm\left(\frac{\epsilon_{xx}}{\epsilon_{zz}} x^2 - z^2\right)$$

To minimize the capacitance and power dissipation of the electro-optic deflection stages 13 and 14 according to my invention, the surfaces of crystals 25 and 26 between electrodes 16–19 and 20–23, respectively, are cut along the electric flux lines. In horizontal deflection stage 13 where $B=0$, the flux lines in the x–z plane are given by $$\phi = \frac{A}{2}\left(x^2 - \frac{\epsilon_{xx}}{\epsilon_{zz}} z^2\right) \tag{11}$$

The surfaces between electrodes 16–19 in crystal 25 of FIG. 2 should therefore be of the general form $$\pm\left(x^2 - \frac{\epsilon_{xx}}{\epsilon_{zz}} z^2\right)$$

In vertical deflection stage 14, $A=0$, and the flux lines are given by $$\phi = Bxz \tag{12}$$

Accordingly, the surfaces between electrodes 20–23 should be of the form $\pm xz$.

FIG. 2 illustrates the required contours of electrodes 16–19 and of the surfaces of crystal 25 therebetween in the horizontal deflection stage 13. The distance of closest approach of the electrode and crystal surfaces to the stage axis is taken to be $R_0$. Note that the adjacent surface in FIG. 2 have eccentricities which are related according to the respective ratios of $\epsilon_{xx}$ and $\epsilon_{zz}$. Vertical deflection stage 14, if illustrated as in FIG. 2, would have surface contours identical to those shown in FIG. 2 with the electrodes rotated clockwise about the y axis by 45 degrees.

As was shown in the above-cited patent of E. A. Ohm and myself, a hyperbolic electrode surface can be circularly shaped in cross section to a good aproximation with the center at a distance twice the radius of the circle from the axis of the deflection stages. (The electrode-to-electrode spacings are then only 0.8 percent larger than those of a hyperbola at the deflector edges.) To simplify the construction of my apparatus, therefore, the above-described hyperbolic electrode sections and crystal surfaces in stages 13 and 14 may be replaced, in cross section, by portions of circles whose closest approach to the stage axis is $R_0$ as shown for a horizontal deflection stage in FIG. 3, to which reference is now made.

Figure 3:
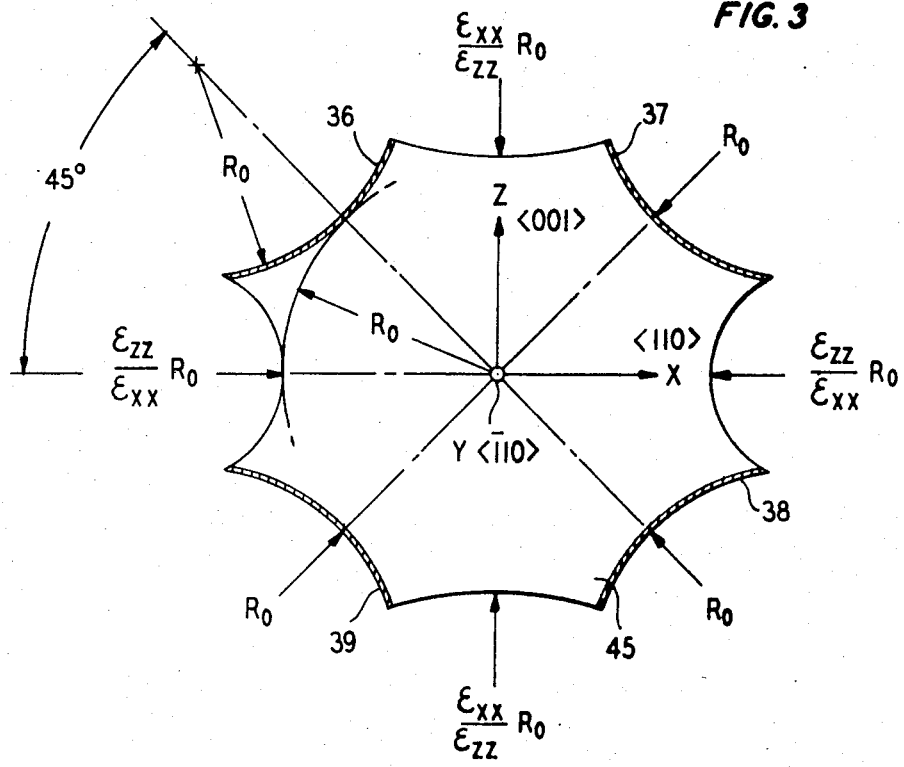
FIG. 3 is a pictorial illustration of a cross-sectional view of a deflection stage 33, interchangeable with stage 13 of FIG. 1, in which the electrode and surface contours are circular in cross section.

Accordingly, in FIG. 3, electrodes 36–39 in horizontal deflection stage 33 are arcuate in cross section with radii of curvature normal to the axis given by $R_0$. The surfaces of crystal 45 orthogonally intersecting the $x$ axis have radii of curvature given by $$\frac{\epsilon_{zz}}{\epsilon_{xx}} R_0$$

The surfaces of the crystal 45 orthogonally intersecting the $z$ axis have radii given by $$\frac{\epsilon_{xx}}{\epsilon_{zz}} R_0$$

Again, a vertical deflection stage to complement the horizontal stage 33 of FIG. 3 in a two-coordinate deflection system, would be identical thereto with the electrodes rotated clockwise about the $y$ axis by 45 degrees.

It should be noted that $\epsilon_{xx}$ and $\epsilon_{zz}$ are numerically equal to about 44.3 and 20.2, respectively and the respective ratios $$\frac{\epsilon_{zz}}{\epsilon_{xx}} \text{ and } \frac{\epsilon_{xx}}{\epsilon_{zz}}$$

are numerically equal to approximately 0.46 and 2.2, for the specific case of KDP. The differences between the radii of curvature of adjacent surfaces of the crystals are therefore significant and cannot be neglected in the proper design of the device.

I claim:

1. Apparatus for deflecting an incident electromagnetic energy beam, said apparatus being of the type comprising first and second quadrupole deflection stages including at least one body of electro-optic material having an optic axis along which an electric field is applied, each of said stages including four electrodes laterally disposed about the axis thereof normal to said optic axis of said material and parallel to the mean direction of propagation of said beam therein to provide a constant field on said stage axis when driven in quadrupole fashion, said apparatus being characterized in that said body includes eight lateral surfaces each of which is arcuate in cross section with a hyperbolic shape with respect to said stage axis, the normals to the respective surfaces through said stage axis being displaced with respect to one another by 45 degrees about said stage axis,
   the eccentricity of the adjacent hyperbolic surfaces of said body being related according to the respective ratios of first and second low frequency dielectric constants of said material, the first dielectric constant being taken parallel to said optic axis, the second dielectric constant of said material being taken normal to said optic axis and normal to said stage axis,
   the four electrodes in said first stage contacting and conforming to the contour of four alternate surfaces of said body, and
   the four electrodes in said second stage contacting and conforming to the contour of the remaining four surfaces of said body displaced by 45 degrees about said stage axis with respect to the electrodes in said first stage.

2. The apparatus according to claim 1 including two bodies of electro-optic material aligned along a common stage axis, one body in each of said first and second deflection stages, said bodies having like crystalline axis orientations in said stages.

3. The apparatus according to claim 1 wherein, relative to a coordinate system in which the $y$ axis coincides with said stage axis, the $z$ axis coincides with said optic axis and the $x$ axis is orthogonal to the $y$ and $z$ axes, the low frequency dielectric constant of said material taken parallel to said optic axis is given by $\epsilon_{zz}$ and the low frequency dielectric constant taken normal to said optic axis and normal to said stage axis is given by $\epsilon_{xx}$,
   the distance from the $y$ axis to said eight surfaces along the normals thereto is given by $R_0$,
   the two surfaces of said body orthogonally intersecting the $z$ axis are of the form $$-R_0^2 = \frac{\epsilon_{zz}}{\epsilon_{xx}} x^2 - z^2$$

the two surfaces of said body orthogonally intersecting the $x$ axis are of the form $$R_0^2 = x^2 - \frac{\epsilon_{xx}}{\epsilon_{zz}} z^2$$

the remaining four surfaces orthogonally intersecting lines at 45 degrees between the $x$ and $z$ axes are of the form $$\frac{R_0^2}{2} = \pm xz$$

the four electrodes in said first stage contact and conform to the contour of the four surfaces orthogonally intersecting the lines at 45 degrees between the $x$ and $z$ axes, and
   the four electrodes in said second stage contact and conform to the contour of the four surfaces orthogonally intersecting the $x$ and $z$ axes.

4. Apparatus for deflecting an incident electromagnetic energy beam, said apparatus being of the type comprising first and second quadrupole of deflection stages including at least one body of electro-optic material having an optic axis along which an electric field is applied, each of said stages including four electrodes laterally disposed about the axis thereof normal to said optic axis of said material and parallel to the mean direction of propagation of said beam therein to provide a constant field on said stage axis when driven in quadrupole fashion, said apparatus being characterized in that said body includes eight lateral surfaces each of which is arcuate in cross section with a concave circular shape with respect to said stage axis, the normals to the respective surfaces through said stage axis being displaced with respect to one another by 45 degrees about said stage axis,
   the radii of curvature of the adjacent circular surfaces of said body being related according to the respective ratios of first and second low frequency dielectric constants of said material, the first dielectric constant being taken parallel to said optic axis, the second dielectric constant of said material being taken normal to said optic axis and normal to said stage axis,
   the four electrodes in said first stage contacting and conforming to the contour of four alternate surfaces of said body, and
   the four electrodes in said second stage contacting and conforming to the contour of the remaining four surfaces of said body displaced by 45 degrees about said stage axis with respect to the electrodes in said first stage.

5. The apparatus according to claim 4 including two bodies of electro-optic material aligned along a common stage axis, one body in each of said first and second deflection stages, said bodies having like crystalline axis orientations in said stages.

6. The apparatus according to claim 4 wherein, relative to a coordinate system in which the $y$ axis coincides with said stage axis, the $z$ axis coincides with said optic axis and the $x$ axis is orthogonal to the $y$ and $z$ axes, the low frequency dielectric constant of said material taken parallel to said optic axis is given by $\epsilon_{zz}$ and the low frequency dielectric constant taken normal to said optic axis and normal to said stage axis is given by $\epsilon_{xx}$,
   the distance from the $y$ axis to said eight surfaces along the normals thereto is given by $R_0$, the two surfaces of said body orthogonally intersecting the $x$ axis have radii of curvature given by $$\frac{\epsilon_{zz}}{\epsilon_{xx}} R_0$$

the two surfaces of said body orthogonally intersecting the $z$ axis have radii of curvature given by $$\frac{\epsilon_{xx}}{\epsilon_{zz}} R_0$$

the remaining four surfaces orthogonally intersecting lines at 45 degrees between the $x$ and $z$ axes have radii of curvature given by $R_0$.

the four electrodes in said first stage contact and conform to the contour of the four surfaces orthogonally intersecting lines at 45 degrees between the $x$ and $z$ axes, and the four electrodes in said second stage contact and conform to the contour of the four surfaces orthogonally intersecting the $x$ and $z$ axes.

References Cited
UNITED STATES PATENTS 3,575,487    4/1971    Ohm et al.

DAVID SCHONBERG, Primary Examiner

P. R. MILLER, Assistant Examiner

U.S. Cl. X.R.

350—160, Dig. 2